(12) United States Patent
Meissner

(10) Patent No.: US 6,335,115 B1
(45) Date of Patent: Jan. 1, 2002

(54) SECONDARY LITHIUM-ION CELL WITH AN AUXILIARY ELECTRODE

(75) Inventor: Eberhard Meissner, Hofheim (DE)

(73) Assignee: NBT GmbH (DE)

( * ) Notice: Subject to any disclaimer, the term of this patent is extended or adjusted under 35 U.S.C. 154(b) by 0 days.

(21) Appl. No.: 09/414,032

(22) Filed: Oct. 4, 1999

(30) Foreign Application Priority Data

Oct. 5, 1998 (DE) .......................................... 198 45 668

(51) Int. Cl.[7] .................................................. H01M 6/36
(52) U.S. Cl. ................................... 429/117; 429/231.95
(58) Field of Search ............................ 429/49, 52, 59, 429/60, 117, 149, 231.1, 231.4, 231.8, 231.95

(56) References Cited

U.S. PATENT DOCUMENTS

| 5,340,670 A | 8/1994 | Takami et al. | |
| 5,432,029 A | 7/1995 | Mitate et al. | |
| 5,601,951 A | * 2/1997 | Johnson et al. | |
| 5,721,067 A | * 2/1998 | Jacobs et al. | |
| 6,025,093 A | * 2/2000 | Herr | |
| 6,060,186 A | * 5/2000 | Broussely | |

FOREIGN PATENT DOCUMENTS

DE 195 28 049 A1 2/1997

* cited by examiner

Primary Examiner—Carol Chaney
Assistant Examiner—Susy Tsang
(74) Attorney, Agent, or Firm—Schnader Harrison Segal & Lewis LLP

(57) ABSTRACT

Secondary lithium-ion cells which include at least one lithium-intercalating, carbon-containing negative electrode, a nonaqueous lithium ion-conducting electrolyte and at least one lithium-intercalating positive electrode including a lithium-containing chalcogen compound of a transition metal, the electrodes being separated from one another by separators. A lithium-containing auxiliary electrode is disposed in the cell to compensate for the irreversible capacity loss in the secondary lithium-ion cell.

10 Claims, 1 Drawing Sheet

SECONDARY LITHIUM-ION CELL WITH AN AUXILIARY ELECTRODE

BACKGROUND

Field of the Invention

The invention relates to a secondary lithium-ion cell which includes at least one lithium-intercalating, carbon-containing negative electrode, a nonaqueous lithium ion-conducting electrolyte and at least one lithium-intercalating positive electrode comprising a lithium-containing chalcogen compound of a transition metal, the electrodes being separated from one another by separators.

Description of the Related Art

Lithium-ion cells have a negative and a positive electrode into each of which lithium can be reversibly intercalated. As the lithium-ion cells are charged and discharged, lithium is alternately stored in the positive and in the negative electrode, so that the total amount of cyclable charge corresponds to the amount of lithium flowing back and forth between the two electrodes. Usually, an amount of active material of one of the two electrodes is selected in assembling the lithium-ion cells such that it contains, in stored form, the amount of lithium available for subsequent cyclic operation. In many cases, the active material used as positive electrode material is a lithium-containing compound such as, but not limited to, lithium manganese spinel, lithium cobalt oxide, lithium nickel oxide or substances derived from these compounds or mixtures of these substances.

Examples of negative active materials used include carbon or metal oxides.

When the lithium-ion cells are assembled and filled with electrolyte, the active materials have a difference in potential of at most about 2 volts when compared to each other. The difference in potential between the electrodes, after the lithium-ion cell has been charged, is about 4 volts. When the lithium-ion cell is charged for the first time, lithium is deintercalated from the positive electrode and introduced into the negative electrode. As a result, the potential of the negative electrode is lowered significantly (toward the potential of metallic lithium), and the potential of the positive electrode is further increased (to even more positive levels).

These changes in potential may give rise to parasitic reactions, both on the positive and, in particular, on the negative electrode. On the surfaces of carbon negative electrodes, for example, decomposition products are known to form, which comprise lithium and components of the electrolyte (solid electrolyte interface, SEI). These surface layers, also referred to as covering layers, are lithium-ion conductors which establish an electronic connection between the negative electrode and the electrolyte and prevent the reactions from proceeding any further.

Formation of this covering layer is therefore necessary for the stability of the half-cell system comprising the negative electrode and the electrolyte. On the other hand, however, as the layer is formed, a portion of the lithium introduced into the cells via the positive electrode is irreversibly bound and thus removed from cyclic operation, i.e. from the capacity available to the user. This means that, in the course of the first discharge, not as much lithium moves from the negative electrode to the positive electrode as had previously been released to the negative electrode in the course of the first charging operation.

A further drawback is that the formation of the covering layer on the negative electrode after the first charging operation has not yet reached completion, but instead progresses further during the subsequent charging and discharge cycles. Even though this process becomes less pronounced during the further charging and discharge cycles, it still causes continuous abstraction, from the system, of lithium which is no longer available for cyclic operation and thus for the capacity of the cell.

U.S. Pat. Nos. 5,340,670 and 5,432,029 disclose active materials for negative electrodes of lithium-ion cells, which are claimed to exhibit a reduced irreversible capacity loss. Additionally, U.S. Pat. Nos. 4,980,250 and 5,436,093 disclose methods by means of which lithium is introduced into the active material of the negative electrode in order to minimize the lithium consumption and thus the irreversible capacity loss. The first-mentioned documents, however, lead to materials which still exhibit the irreversible capacity loss, and the methods for prelithiating the negative active materials lead to electrodes which can be handled only under dry-room conditions.

DE-A 195 28 049 discloses lithium-ion cells in which a lithium-rich compound such as metallic lithium or a lithium alloy has been introduced into the cells in such a way that said compound, after the cell has been filled with electrolyte, is in electrolytic contact with at least one of the electrodes. As a result of the difference in potential between the electrode materials, an equalizing current will flow between the particular active electrode material and the lithium-rich compound introduced and, as a result, additional lithium will be introduced into the electrodes. This additional lithium reduces the irreversible capacity loss arising from the above-mentioned parasitic reactions or even to largely eliminate it.

A problem with this procedure, however, is that local lithium enrichment cannot be precluded. These local enrichments either represent a massive safety risk, because of the high reactivity of electrode positioned lithium metal, or they result in the lithium-storing positive electrode material being transmuted into a phase which is less suitable for further cyclic operation.

OBJECT OF THE INVENTION

It is an object of the invention to specify a lithium-ion cell and a method for operating it, which compensate for or minimize the irreversible capacity loss and which do not result in substantial safety risks.

SUMMARY OF THE INVENTION

A preferred aspect of the invention is a secondary lithium-ion cell including a secondary lithium-ion cell comprising at least one lithium-intercalating, carbon-containing negative electrode; a nonaqueous lithium ion-conducting electrolyte; at least one lithium-intercalating positive electrode comprising a lithium-containing chalcogen compound of a transition metal; a separator separating the positive and negative electrodes; and a lithium-containing auxiliary electrode disposed within the cell, such that the auxiliary electrode is spatially separated from and positioned for selective contact, subsequent to sealing the cell, with the electrolyte, for supplying additional lithium to the cell.

DETAILED DESCRIPTION

Figure 1:
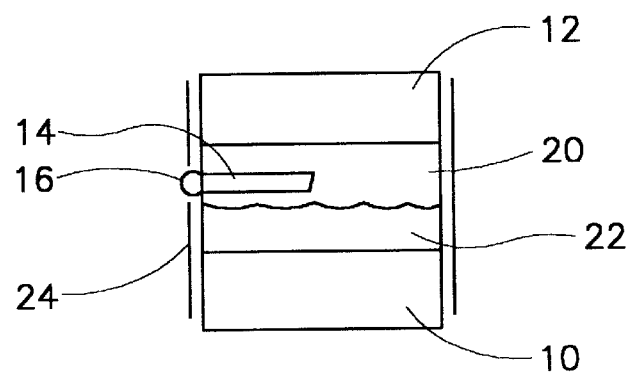
FIG. 1 is an elevational, cross-sectional view of a secondary lithium-ion cell according to the invention.

It will be appreciated that the following description is intended to refer to specific embodiments of the invention selected for illustration in the drawings and is not intended to define or limit the invention, other than in the appended claims.

According to the invention and as shown in FIG. 1, a secondary lithium-ion cell includes at least one negative electrode 10, a non-aqueous lithium-ion conducting electrolyte 22, a separator 20, a positive electrode 12, and an auxiliary electrode 14. The auxiliary electrode is used to provide additional lithium to the cell.

The additional amount of lithium is neither supplied to one of the electrodes prior to assembly, nor automatically released to an electrode after the cell has been filled with electrolyte. Instead the additional amount of lithium is supplied to an electrode at a later time in a defined manner.

The defined manner in which the lithium is introduced into one of the electrodes is achieved by an electrolytic and/or electronic contact of the auxiliary electrode 14 being established with one of the electrodes.

Preferably, the electronic connection is achieved via a special potential connection. For example, a third connection terminal 16 or the lateral surface of a metallic cell jacket 24 which is insulated with respect to the electrodes may be used. The special potential connection 18 is used to electronically connect the auxiliary electrode 14 to one of the positive 12 or negative 10 electrodes. Through this connection, additional lithium enters the cycle to replace lithium lost to parasitic reactions. It is important that the auxiliary electrode 14 be isolated or insulated from the electrodes until the introduction of additional lithium is desired.

Figure 2:
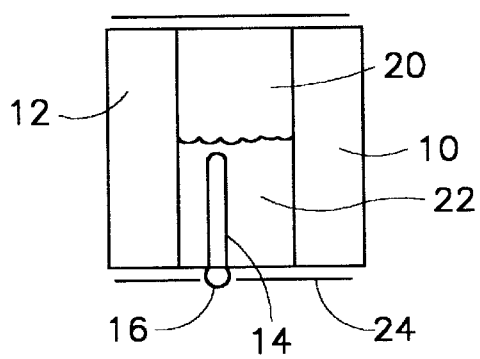
FIG. 2 is an elevational, cross-sectional view of a secondary lithium-ion cell according to the invention showing the auxiliary electrode in electrolyte contact with said positive and negative electrodes.
Figure 3:
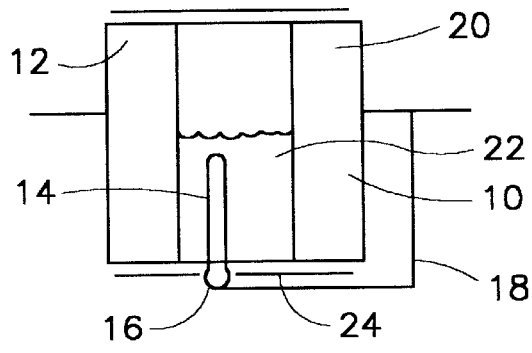
FIG. 3 is an elevational, cross-sectional view of a secondary lithium-ion cell according to the invention showing the auxiliary electrode in electrolyte and electronic contact with the negative electrode.

Electrolytic contact is established by means of the auxiliary electrode 14 which is disposed outside the electrolyte 22 level and does not make electrolytic contact until the cell is tilted or the electrolyte level is raised as shown in FIGS. 2–3. Once the auxiliary electrode 14 is in contact with the electrolyte 22, it is in position to deliver additional lithium to the cell.

The point in time for the electrolytic and electronic connection of the auxiliary electrode with one of the electrodes is preferably chosen such that it corresponds to the point in time at which, in the course of the cell charge/discharge cycle, one of the electrodes undergoes a marked change in potential. During the charge phase, this is done only after the cell has been charged to at least 50% of its capacity. Particular preference is given to the point in time at which the cell enters the range of the steep cell voltage drop in the course of the discharge. The cell voltage is kept at a constant level during the electrolytic and electronic contact of the auxiliary electrode to one of the electrodes.

Although this invention has been described in connection with specific forms thereof, it will be appreciated that a wide array of equivalents may be substituted for the specific elements described herein without departing from the spirit and scope of the invention as described in the appended claims.

We claim:

1. A secondary lithium-ion cell comprising:
   at least one lithium-intercalating, carbon-containing negative electrode;
   a nonaqueous lithium ion-conducting electrolyte;
   at least one lithium-intercalating positive electrode comprising a lithium-containing chalcogen compound of a transition metal;
   a separator separating said positive and negative electrodes; and
   a lithium-containing auxiliary electrode disposed within the cell such that said auxiliary electrode is spatially separated from said electrolyte when the cell is positioned in a first orientation and contacts said electrolyte when the cell is oriented in a second position, for supplying additional lithium to the cell.

2. The secondary lithium-ion cell of claim 1, wherein the auxiliary electrode is positioned above the electrolyte level, when the cell is sealed.

3. The secondary lithium-ion cell of claim 1, wherein said auxiliary electrode contacts said electrolyte, and wherein lithium from the auxiliary electrode is conducted to said one of said positive and negative electrodes during the charge/discharge cycle of the cell.

4. The secondary lithium-ion cell of claim 1, wherein the auxiliary electrode has a separate terminal connection.

5. The secondary lithium-ion cell of claim 1, wherein said auxiliary electrode is electrically isolated or insulated from said positive and negative electrodes.

6. A secondary lithium-ion cell comprising:
   at least one lithium-intercalating, carbon-containing negative electrode;
   a nonaqueous lithium ion-conducting electrolyte;
   at least one lithium-intercalating positive electrode comprising a lithium-containing chalcogen compound of a transition metal;
   a separator separating said positive and negative electrodes; and
   a lithium-containing auxiliary electrode disposed within the cell and between the positive and the negative electrodes, such that said auxiliary electrode is electrically isolated or insulated from the positive and negative electrodes, wherein said auxiliary electrode is brought into electronic contact with one of said positive and negative electrodes by connecting an auxiliary external contact of the auxiliary electrode to one of the positive or negative electrodes such that lithium from the auxiliary electrode is conducted to said one of said electrodes during the charge/discharge cycle of the cell.

7. The secondary lithium-ion cell of claim 6, wherein the cell has a metallic or electrically conductive jacket to which the auxiliary electrode is electrically connected.

8. A secondary lithium-ion cell comprising:
   at least one lithium-intercalating, carbon-containing negative electrode;
   a nonaqueous lithium ion-conducting electrolyte;
   at least one lithium-intercalating positive electrode comprising a lithium-containing chalcogen compound of a transition metal;
   a separator separating said positive and negative electrodes; and
   a lithium-containing auxiliary electrode disposed within the cell and between the positive and the negative electrodes, such that said auxiliary electrode is electrically isolated or insulated from said positive and negative electrodes.

9. The secondary lithium-ion cell of claim 8, wherein the auxiliary electrode has a separate terminal connection.

10. A secondary lithium-ion cell comprising:
    at least one lithium-intercalating, carbon-containing negative electrode;
    a nonaqueous lithium ion-conducting electrolyte;
    at least one lithium-intercalating positive electrode comprising a lithium-containing chalcogen compound of a transition metal;

a separator separating said positive and negative electrodes; and a lithium-containing auxiliary electrode disposed within the cell, such that said auxiliary electrode is electrically isolated or insulated from said positive and negative electrodes, wherein the cell has a metallic or electrically jacket to which the auxiliary electrode is electrically connected.

* * * * *